May 26, 1959 C. A. MORENO 2,888,674
DUAL LENS ANTENNA FOR TRACKING AND SEARCHING
Filed March 20, 1951 2 Sheets-Sheet 1
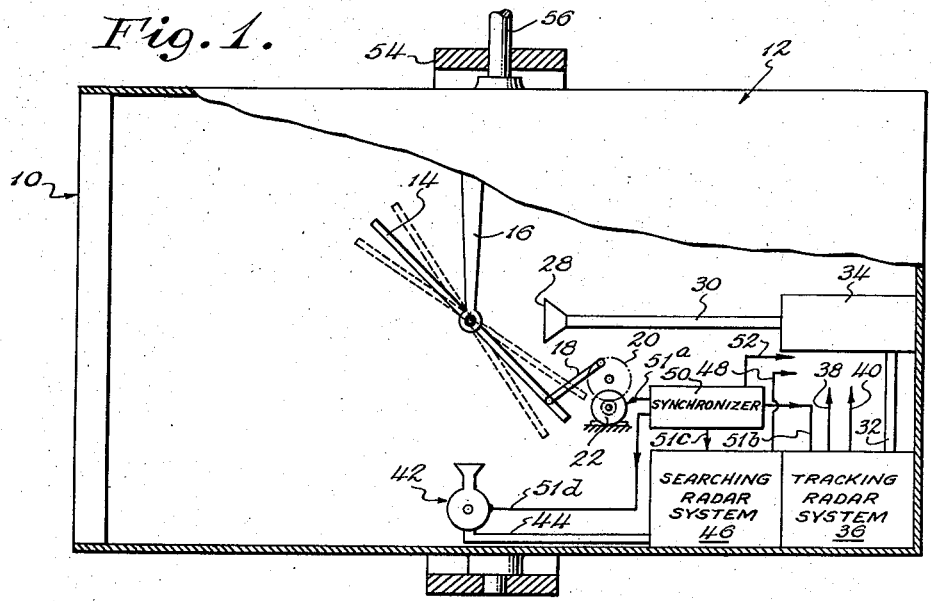
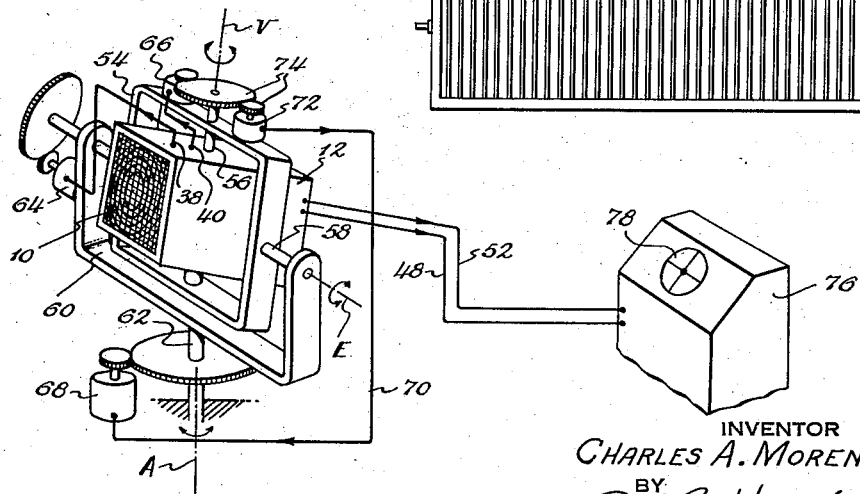
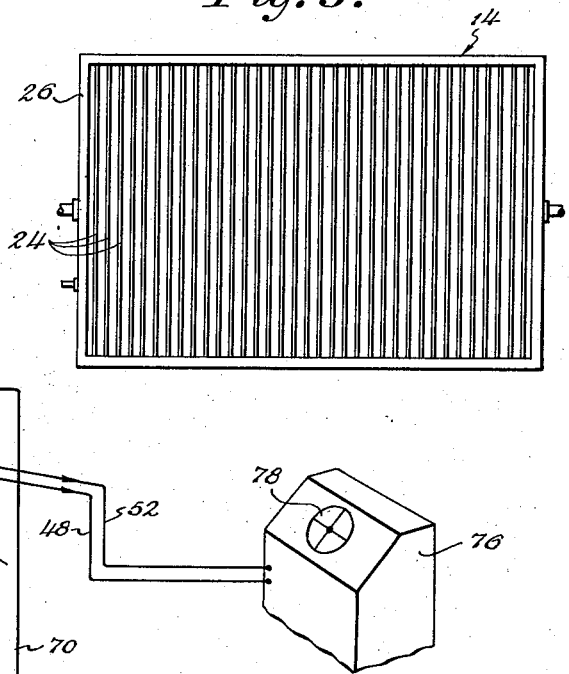
INVENTOR
CHARLES A. MORENO
BY
Paul B. Hunter
ATTORNEY May 26, 1959   C. A. MORENO   2,888,674
DUAL LENS ANTENNA FOR TRACKING AND SEARCHING
Filed March 20, 1951   2 Sheets-Sheet 2
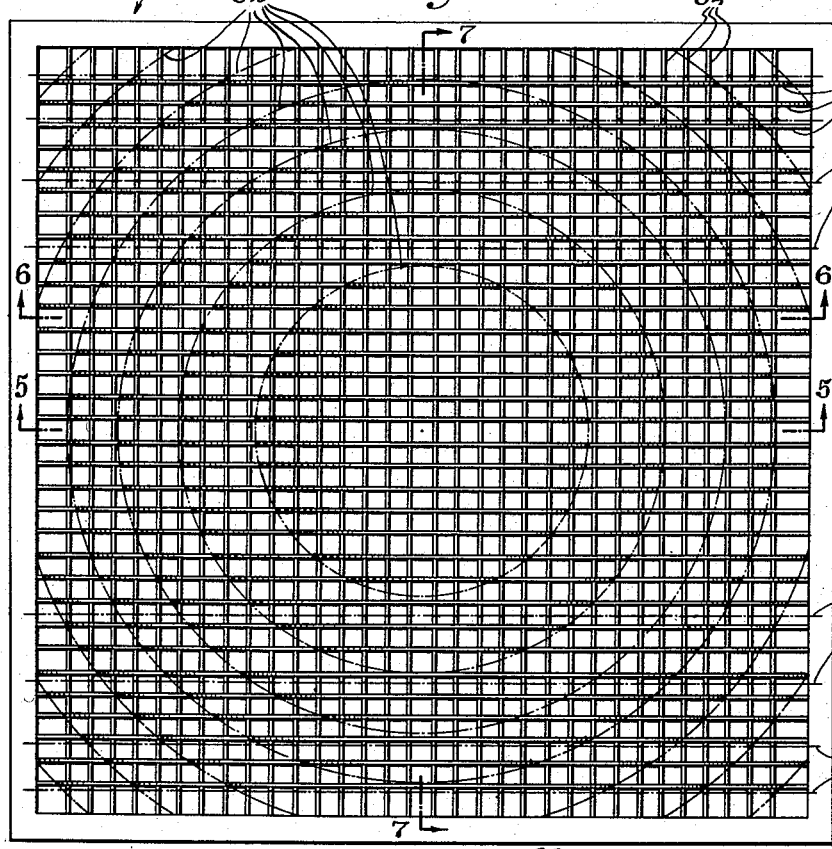
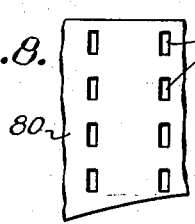
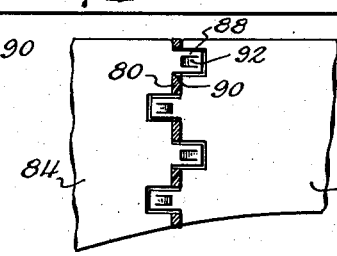
INVENTOR
CHARLES A. MORENO
BY
ATTORNEY

United States Patent Office 2,888,674
Patented May 26, 1959

2,888,674

DUAL LENS ANTENNA FOR TRACKING AND SEARCHING

Charles A. Moreno, Franklin Square, N.Y., assignor to Sperry Rand Corporation, a corporation of Delaware Application March 20, 1951, Serial No. 216,570

17 Claims. (Cl. 343—7.4)

This invention relates to radar apparatus and particularly to radar apparatus for simultaneously performing the functions of searching and tracking by means of an antenna having a single aperture.

In modern warfare it is often desirable that the radar apparatus which is employed to locate and track enemy aircraft be capable of searching a limited region of space around the aircraft being tracked so as to observe any missiles which are launched from the aircraft and so as to observe other aircraft in the vicinity of the aircraft being tracked.

Conventional radar systems for searching and tracking ordinarily employ separate antennas for performnig these two functions. If it is necessary to track an object and to simultaneously search a limited region of space around the object being tracked, synchronization of the movement of the two antennas is difficult. Also, such arrangements occupy a large amount of space and are rather heavy.

These difficulties are minimized in the present invention by employing an antenna having a single aperture for directing and receiving the radio frequency energy employed to perform both the searching and the tracking functions. In a preferred embodiment, the antenna is a dual lens arrangement composed of two sets of metal plates which are located between and at right angles to one another somewhat like the structure of an egg crate. The dual lens antenna is arranged so that the directive axes of the two lenses coincide, thereby permitting one lens to function as part of a tracking radar system and permitting the other lens to function as part of a searching radar system which simultaneously searches a limited region of space which has an axis of symmetry which coincides with the axis of the tracking system. It will be apparent that the two directive axes of the dual lens may be parallel or may be located at an angle to one another, if desired.

The dual lens antenna and the tracking and searching radar apparatus may be mounted in a box-like enclosure which is supported in a gimbal system so as to permit tracking of targets in the vicinity of the radar apparatus.

Accordingly, it is an object of this invention to provide an improved radar apparatus for locating and tracking an object and for simultaneously searching in the vicinity of the object being tracked.

Another object of the invention is to provide a radar apparatus for searching and tracking which employs an antenna having a single aperture, wherein the searching and tracking axes of the apparatus coincide.

A further object of the invention is to provide a metal plate dual lens antenna. An additional object of the invention is to provide a pair of spaced transducers for electromagnetic energy having intersecting directive axes and means for redirecting said energy without mutual interference along a common directive axis.

These and other objects of the invention will be apparent from the following description, the appended claims, and the drawings; wherein Fig. 1 is a side view, partially broken away, showing the radar apparatus mounted in a box-like enclosure;

Fig. 2 is an oblique view showing how the box-like enclosure containing the radar apparatus may be mounted in a gimbal system;

Fig. 3 shows a polarization-sensitive reflector which is employed in the radar apparatus;

Fig. 4 is an elevation view showing the illuminated face of the dual lens antenna which is employed in the radar apparatus;

Figs. 5–7 are cross-sectional views of the dual lens antenna shown in Fig. 4; and Figs. 8 and 9 illustrate how the metal plates of the lens antenna shown in Fig. 4 may be joined together.

Fig. 1 shows how the dual lens metal plate antenna and the associated radar apparatus may be mounted in a single enclosure so as to minimize the losses in the radio frequency circuits and so as to minimize the amount of equipment required to interconnect the lens antenna and the associated radar apparatus.

The metal plate dual lens antenna 10 serves as one end of a box 12 which encloses the radar apparatus. The dual lens antenna 10, which will be described in detail hereinafter with reference to Figs. 4–9, is composed of two sets of metal plates which are located between and at right angles to one another somewhat like the structure of an egg crate. One set of metal plates is a point-focus lens which focuses or collimates energy in two planes, and the other set of metal plates is a line-focus lens which focuses or collimates energy in one plane.

In the embodiment of the invention shown in Fig. 1, and in the elevation view of the dual lens shown in Fig. 4, the metal plates of the line-focus portion of the dual lens are vertical so that the line-focus portion of the lens serves to focus or collimate energy which is vertically polarized. The metal plates of the point-focus portion of the dual lens are horizontal so that the point-focus portion of the dual lens serves to focus or collimate energy which is horizontally polarized.

As will hereafter be explained in connection with Figs. 1 and 4, the focal length of the line-focus portion of the dual lens is shown slightly longer than that of the point-focus portion. However, the two portions of the dual lens may have focal lengths which are either equal or unequal.

A polarization-sensitive reflector 14 is located along the axis of the dual lens antenna 10 and is inclined with respect thereto. The reflector 14 is pivoted about a fixed support 16 so that the inclination of the reflector may be varied periodically about a 45° inclination, for example, with respect to the axis of the antenna 10 by means of an arm 18 and a rotor 20 which is rotated by a motor 22.

The polarization-sensitive reflector 14 is shown in Fig. 3. It comprises a grating composed of a plurality of uniformly spaced parallel rods 24 which lie in a common plane and which are rigidly supported within a suitable frame 26.

By properly proportioning the diameter of the rods 24 and the spacing between the rods, the reflector 14 is designed so as to be transparent to waves so polarized that the electric field is perpendicular to the rods 24 but so as to reflect waves so polarized that the electric field is parallel to the rods 24. A diameter of about $\frac{1}{32}$ of a wavelength for the rods 24, and a spacing between the rods of about three times the diameter of the rods gives satisfactory results for all the angles of incidence required by the apparatus shown in Fig. 1. The polarization-sensitive reflector 14 is oriented so as to reflect electromagnetic energy having line-focus polarization and so as to be transparent to electromagnetic energy having point-focus polarization.

A nutating feed horn 28, which is located adjacent to the focus of the point-focus portion of the lens antenna 10 and along the axis of the antenna 10, serves as a transducer for the polarized electromagnetic energy which is collimated or focused by the point-focus portion of the lens antenna 10. The horn 28 has approximately equal directivity in azimuth and elevation. Wave guides 30 and 32, which are coupled to one another within a nutator 34, serve to couple the horn 28 to a tracking radar system 36.

The nutator 34 may be any conventional type which serves to cause the wave guide 30 and the horn 28 to rotate about a conical path while maintaining the orientation of the horn 28 and the wave guide 30 so that the polarization of the energy emitted and received by the horn 28 is the same when the horn is in any position.

The tracking radar system 36 may be a conventional type suitable for use with a nutating scanner, and it serves to produce elevation and traverse error signals at leads 38 and 40 which are employed to actuate the servo systems which serve to orient the lens antenna 10 so that it is caused to follow the object being tracked. Preferably, the tracking radar system 36 contains conventional apparatus for automatically producing servo control signals at leads 38 and 40 which serve to cause the servo systems to orient and move the box 12 in a predetermined manner so that the radar apparatus is caused to scan in a predetermined manner until a target is located. If desired, conventional means may be provided for manual control over the orientation of the radar apparatus until a target is located.

It will be apparent that the nutating feed system may be replaced by separate fixed feed arrangements if it is desired to employ a lobe comparison system.

A line scanner 42, which is located at the focus of the line-focus portion of the lens antenna 10, as offset by the polarization-sensitive reflector 14, serves as a transducer for the polarized electromagnetic energy which is collimated or focused by the line-focus portion of the lens antenna 10.

The line scanner 42 may be a conventional type which serves to periodically vary the angle at which the wavefronts of electromagnetic energy emerge along a line. The line scanner 42 should emit energy along a line having a length substantially equal to the dimension of the lens antenna 10 which is parallel thereto, and it should have little directivity in elevation and considerable directivity in azimuth.

Thus, the directive axes of the transducers 28 and 42 intersect approximately at the center of the polarization-sensitive reflector 14, and the radar systems are polarized to produce and to receive the electromagnetic waves having polarizations which are substantially at right angles to one another at the location of the polarization-sensitive reflector 14.

A wave guide 44 connects the scanner 42 to a searching radar system 46 which may be a conventional type adapted to produce an output signal over a lead 48 when reflected energy is received thereby.

A synchronizer 50 is connected to the motor 22, the radar systems 36 and 46, and the scanner 42 by means of the leads 51a, 51b, 51c and 51d, respectively. The synchronizer 50 serves to actuate the two radar systems 36 and 46 and the scanner 42 in proper synchronism in a conventional manner. The synchronizer 50 also serves to actuate the motor 22 so that the inclination of the polarization-sensitive reflector 14 is caused to vary in synchronism with the action of the line scanner 42. The polarization-sensitive reflector 14 is caused to oscillate about a 45° inclination with respect to the directive axis of the antenna 10 in a sinusoidal manner.

The inclination of the reflector 14 can be varied between the limits shown by the dashed line positions shown in Fig. 1, so as to direct the beam upward and downward in synchronism with the action of the line scanner 42, which provides lateral movement of the beam. Thus, the combination of the line scanner 42 and the reflector 14 may be adjusted and synchronized to cause the radio beam of the searching radar system to periodically scan a predetermined region in space. It will be observed that in the preferred embodiment of the invention shown in Fig. 1 the axis of a symmetry of the region in space which is scanned coincides with the axis of the tracking radar system.

The synchronizer 50 also produces a signal over a lead 52 which serves to actuate the sweep generator of the oscilloscope indicator 76 (shown in Fig. 2) for the radar apparatus.

Fig. 2 illustrates how the box 12 containing the radar apparatus may be mounted in a three-axis gimbal system so as to permit tracking of targets anywhere within a hemisphere around the radar apparatus.

The box 12 is supported in a gimbal 54 by trunnions 56 so that the box 12 may be rotated about a traverse axis V. The gimbal 54 is rotatably mounted about an elevation axis E by means of trunnions 58 which are rotatably mounted in a gimbal yoke 60. The yoke 60 may be rotated about a train axis A by means of a shaft 62.

An elevation servo 64, which is responsive to the error signals supplied over the lead 38 from the tracking radar system, serves to control the position of the box 12 about the elevation axis E.

A traverse servo 66, which is responsive to the error signals supplied over the lead 40 from the tracking radar system, serves to control the position of the box 12 about the traverse axis V.

Thus far it is apparent that the target is tracked about two axes, the elevation axis E and the traverse axis V, in a conventional manner by means of the radar error signals which are applied to the respective elevation and traverse servos 64 and 66. There are many two-axis tracking systems in the prior art which are suitable for this portion of the tracking system, and if a two-axis tracking system is adequate to meet the requirements of the radar apparatus, a conventional two-axis tracking servo system may be employed with the radar apparatus disclosed herein.

However, it is not feasible to track over a complete hemisphere with a two-axis system, because in order to follow a target which passes directly overhead the radar antenna must turn upside down and this introduces an instantaneous train error of 180° when the target is at 90° elevation. To avoid this problem it is desirable to employ a third axis of rotation called the train axis A.

A train servo 68, which is responsive to the signals supplied over the lead 70 from a servo control 72, serves to control the position of the box 12 about the train axis A. The servo control 72 is actuated by means of gears 74, which in turn are actuated by one of the trunnions 56, and it serves to produce a signal which causes the servo 68 to provide a coarse adjustment of the position of the box 12 about the train axis A.

The gimbal and servo systems shown in Fig. 2 are not part of the present invention, and reference may be had to copending application S.N. 136,970, filed by E. B. Hammond, Jr. on January 5, 1950, for a detailed disclosure thereof.

The output signal of the searching radar system is applied to an oscilloscope 76 over the lead 48, and the synchronizing signal produced by the synchronizer 50 is applied to the sweep generator of the oscilloscope 76 over the lead 52.

The oscilloscope 76 may be any conventional type which is provided with a sweep generator which causes the beam of a cathode-ray tube 78 to sweep across the screen of the tube in a suitable manner in synchronism with the scanning action of the beam of electromagnetic energy produced by the searching radar system.

Fig. 4 is a diagram showing the face of the dual lens antenna 10 which is illuminated by the radio frequency energy produced by the two radar systems.

As discussed above, the dual lens antenna comprises two sets of metal plates which are located between and at right angles to one another somewhat like the structure of an egg crate.

The shapes of both sets of the metal plates are designed in the same manner as they would if two separate lens antennas were being constructed, and then the metal plates of one set are cut into sections of suitable width so that they may be inserted between the employed as spacers for the other set of plates.

Preferably, both sets of the metal plates are zoned or stepped in a conventional manner in order to reduce the width and weight of the outer portions of the dual lens.

The design data for point-focus and line-focus metal plate lens elements is well-known and will not be discussed herein. Reference may be had to an article by W. E. Kock entitled "Metal-Lens Antennas" published in the Proceedings of the Institute of Radio Engineers for November 1946 (page 828), for the information required to design the two sets of metal plates.

The set of plates 80 which are horizontal in Fig. 4 constitutes the point-focus portion of the dual lens. The plates 80 which are at the center of the lens antenna 10 are shaped as shown in Fig. 5 which is a cross-sectional view along line 5—5 of Fig. 4. The curved contours of each of the zoned portions are portions of ellipses having a common far focus. The approximate contours of the other plates of the point-focus portion of the lens may be determined by revolving the center plate shown in Fig. 5 about the axis of the lens antenna 10. Fig. 6, which is a cross-sectional view along line 6—6 of Fig. 4, illustrates the shape of the plates of the lens which are offset from the center of the antenna.

Thus, each zoned portion of the point-focus lens defines a portion of a prolate spheroidal surface, and the loci of the end portions of each zoned portion of the point-focus lens lie on the concentric circles 82 shown in Fig. 4.

The set of plates 84 which are vertical in Fig. 4 constitutes the line-focus portion of the dual lens. Each of these vertical elements of the lens is composed of a plurality of sections which are of a suitable width so that they may be located between and employed as spacers for the horizontal plates. The contour of these vertical elements is shown in Fig. 7, which is a cross-sectional view along line 7—7 of Fig. 4, and all of the vertical elements have the same contour. The curved contours of each of the zoned portions are portions of ellipses having a common far focus. Thus, each zoned portion of the line-focus lens defines a portion of a cylindrical elliptical surface. The loci of the end portions of each zoned portion of the point-focus lens lie on the parallel lines 86 shown in Fig. 4.

For best results, the sections comprising each vertical element should be located in line with one another and at right angles to the horizontal plates.

It will be apparent that either set of plates may be cut into sections and employed as spacers for the other set of plates.

Figs. 8 and 9 illustrate how the two sets of metal plates 80 and 84 may be joined together. The plates 84 which serve as spacers are provided with a series of tabs 88 which are inserted through a corresponding series of holes 90 in the plates 80. If desired, each of the tabs 88 may be provided with a tongue 92 so that the tongues 92 serve to lock the tabs in their inserted positions in the holes 90.

When the directive axes of the two sets of metal plates coincide it is preferable that the two sets of metal plates have the same minimum widths, and that the straight longitudinal edges of both sets of plates lie in a common plane.

Since each of the sets of metal plates is located at right angles to the other set of metal plates and since the electric fields of the electromagnetic energy focused or collimated by the two sets of metal plates are at right angles to one another, each portion of the dual lens antenna 10 functions in substantially the same manner as it would function if it were a separate lens antenna. The respective electric fields of the electromagnetic energy focused or collimated by each of the lenses are polarized so as to be parallel to the metal plates of the corresponding portion of the lens; thus, the respective electric fields are not affected by the elements of the dual lens which are located at right angles to the polarizations of the electric fields.

In one embodiment of the dual lens antenna which was constructed, a dual lens which was eight feet square was designed to operate at 5650±250 mc. This antenna permitted searching over a 11° x 11° area and produced small side lobes which were comparable to those produced by a single metal plate lens antenna.

In operation, the orientation of the box 12 and the directive axis of the antenna 10 is controlled automatically or by an operator until an object such as an aircraft is located. Then the tracking radar apparatus serves to cause the directive axis of the antenna 10 to follow or track the object, and the searching radar apparatus serves to provide an image of the object being tracked at the center of the cathode-ray tube 78. Other objects which are near the object being tracked, such as missiles launched from the object being tracked, are indicated on the cathode-ray tube 78 in proper orientation with respect to the object being tracked. Thus, an operator can determine whether the radar apparatus 36 continues to track the aircraft or starts to track the missile. Also, the operator can cause the apparatus to track the missile rather than the aircraft, if desired.

It will be apparent that various modifications may be made in the apparatus disclosed herein without departing from the scope of the invention. For example, the horn 28 could be made highly directive in both azimuth and elevation and then the point-focus portion of the dual lens could be omitted, the aperture of the scanner 42 could be made highly directive in both azimuth and elevation and then the line-focus portion of the dual lens could be omitted, or the polarization-sensitive reflector 14 could be curved so as to focus or collimate the electromagnetic energy having line-focus polarization and then the line-focus portion of the dual lens could be omitted or designed to produce less focusing action.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A lens assembly for ultra-high-frequency electromagnetic energy comprising a first group of parallel spaced metal plates having one set of longitudinal edges lying in a common plane and having the opposite set of longitudinal edges shaped to define a portion of a cylindrical elliptical surface, and a second group of parallel spaced metal plates having one set of longitudinal edges lying in a common plane and having the opposite set of longitudinal edges shaped to define a portion of a prolate spheroidal surface, one of said first or second groups of metal plates being divided into sections and situated between and extending at right angles to the other group of metal plates, said one group of metal plates serving as spacers for said other group of metal plates.

2. The apparatus of claim 1, wherein the center widths of the two groups of plates as measured along the directive axis of the lens are equal.

3. A lens assembly for ultra-high-frequency electromagnetic energy comprising a first group of parallel spaced metal plates having one set of longitudinal edges lying in a common plane and having the opposite set of longitudinal edges zoned, the edges of the plates of each zoned portion being shaped to define a portion of a cylindrical elliptical surface, and a second group of parallel spaced metal plates having one set of longitudinal edges lying in a common plane and having the opposite set of longitudinal edges zoned, the edges of the plates of each zoned portion of said second group being shaped to define a portion of a prolate spheroidal surface, one of said groups of metal plates being divided into sections which are situated between and extend at right angles to the other group of metal plates.

4. In combination, a lens assembly for ultra-high-frequency electromagnetic energy comprising a first lens composed of mutually spaced conductive members, a second lens composed of mutually spaced conductive members, said second lens member situated within and extending substantially at right angles to said first lens members, and first and second ultra-high-frequency transducer means located substantially at the foci of said lens assembly and being adapted for illuminating said lens assembly with first and second beams of ultra-high-frequency energy, said first beam of energy having an electric polarization parallel to said first lens members and said second beam of energy having an electric polarization parallel to said second lens members.

5. In combination, a dual lens for ultra-high-frequency electromagnetic energy for directing energy from a point source and from a line source having electric polarizations at right angles to one another, a polarization-sensitive reflector located along the axis of said dual lens and intermediate said dual lens and the foci thereof and being inclined with respect to the axis of the dual lens and oriented to be transparent to energy having point source polarization and to reflect energy having line source polarization, a first transducer for electromagnetic energy located along the axis of said dual lens substantially at the focus of the lens for point source energy, and a second transducer for electromagnetic energy located substantially at the focus of the lens for line source energy as offset by said polarization-sensitive reflector.

6. The apparatus of claim 5, wherein said polarization-sensitive reflector is a grating comprising a plurality of uniformly spaced parallel rods which lie in a common plane.

7. In combination, a dual lens for ultra-high-frequency electromagnetic energy for directing energy from a point source and from a line source having electric polarizations at right angles to one another, a polarization-sensitive reflector located intermediate said dual lens and the foci thereof and being inclined with respect to the directive axis of said dual lens and oriented to reflect energy having line source polarization, a point source of electromagnetic energy located along the axis of said dual lens substantially at the focus of the lens for point source energy, a line source of electromagnetic energy located substantially at the focus of the lens for line source energy as offset by said polarization-sensitive reflector, means for periodically varying the angle of emergence of the wavefronts of the energy from said line source, and means for periodically varying the attitude of said polarization-sensitive reflector with respect to the axes of said dual lens and said line source of energy.

8. In combination; a dual lens for electromagnetic energy comprising a first set of mutually spaced conductive plates constituting lens elements for electromagnetic energy having an electric polarization substantially parallel to said plates, and a second set of mutually spaced conductive plates located intermediate and substantially at right angles to said first set of plates and constituting lens elements for electromagnetic energy having an electric polarization substantially parallel to the second set of plates; a polarization-sensitive reflector for electromagnetic energy located along the axis of said dual lens and intermediate the dual lens and the foci thereof, said polarization-sensitive reflector being oriented to reflect electromagnetic energy having an electric polarization parallel to one of said sets of plates and to pass electromagnetic energy having an electric polarization parallel to the other set of plates; a first transducer for electromagnetic energy located along the axis of said dual lens substantially at the focus of said other set of plates and having an electric polarization parallel to said other set of plates; and a second transducer for electromagnetic energy located substantially at the focus of said one set of plates as offset by said polarization-sensitive reflector, said second transducer energy having an electric polarization parallel to said one set of plates.

9. Radar apparatus for tracking along and searching about the same axis, comprising a dual lens for ultra-high-frequency energy having a first set of parallel spaced plates and a second set of parallel spaced plates located intermediate and substantially at right angles to said first set, a tracking radar system for directing electromagnetic energy towards and receiving electromagnetic energy from said dual lens at a plurality of locations adjacent to the focus of one of said sets of plates, said tracking radar system serving to produce and receive energy having an electric polarization parallel to said one set of plates, a polarization-sensitive reflector for electromagnetic energy located along the axis of said dual lens intermediate the dual lens and said tracking system, said reflector being inclined with respect to the axis of said dual lens and oriented to pass energy having a polarization parallel to said one set of plates and to reflect energy having a polarization parallel to the other set of plates, a searching radar system for directing electromagnetic energy towards and receiving electromagnetic energy from said dual lens at the focus of said other set of plates as offset by said reflector, and means for periodically varying the inclination of said reflector with respect to the axis of said dual lens.

10. Radar apparatus for tracking along and searching about the same axis; comprising a dual lens for electromagnetic energy having a first group of parallel spaced metal plates having one set of longitudinal edges lying in a common plane and having the opposite set of longitudinal edges zoned, the edges of the plates of each zoned portion being shaped to define a portion of a cylindrical elliptical surface, and a second group of parallel spaced metal plates having one set of longitudinal edges lying in a common plane and having the opposite set of longitudinal edges zoned, the edges of the plates of each zoned portion being shaped to define a portion of a prolate spheroidal surface, one of said first or second groups of metal plates being divided into sections which are located intermediate and at right angles to the other group of metal plates; a polarization-sensitive reflector for electromagnetic energy located along the axis of said dual lens intermediate the dual lens and the foci thereof, said reflector being inclined with respect to the axis of said dual lens and oriented to pass electromagnetic energy having a polarization parallel to said second set of plates and to reflect electromagnetic energy having a polarization parallel to said first set of plates; a tracking radar system for directing electromagnetic energy towards and receiving electromagnetic energy from said dual lens at a plurality of locations adjacent to the focus of said second set of plates, said tracking radar system serving to produce and receive energy having an electric polarization parallel to said second set of plates; a searching radar system for directing electromagnetic energy towards and receiving electromagnetic energy from said dual lens along a line at the focus of said second set of plates as offset by said reflector; and means for periodically varying the inclination of said reflector with respect to the axis of said dual lens.

11. In combination, a pair of spaced transducers for electromagnetic energy having directive axes which intersect and being polarized to produce electromagnetic waves having polarizations which are substantially at right angles to one another at the location where said axes intersect, and a polarization-sensitive reflector located approximately at the position where said axes intersect, said polarization-sensitive reflector being oriented to reflect energy having one of said polarizations and to be transparent to energy having the other of said polarizations.

12. The combination of claim 11, wherein said axes intersect at substantially a right angle and wherein said polarization-sensitive reflector is inclined at approximately a 45° angle to both of said axes.

13. In combination, a pair of radar systems having directive axes for electromagnetic energy which intersect and being polarized to produce electromagnetic waves having polarizations which are substantially at right angles to one another at the location where said axes intersect, a polarization-sensitive reflector located approximately at the position where said axes intersect, said polarization-sensitive reflector being oriented to reflect energy having one of said polarizations and to be transparent to energy having the other of said polarizations, and means for periodically varying the inclination of said reflector with respect to said axes.

14. In combination, a tracking radar system having a directive axis about which electromagnetic energy is transmitted and received, a searching radar system having a directive axis about which electromagnetic energy is transmitted and received, said radar systems being located so that said axes intersect at substantially a right angle and being polarized to produce electromagnetic waves having polarizations which are substantially at right angles to one another at the location where said axes intersect, a polarization-sensitive reflector located approximately at the position where said axes intersect, said polarization-sensitive reflector being oriented to reflect energy from said searching radar system and to be transparent to energy from said tracking radar system, and means for periodically varying the inclination of said reflector with respect to said axes.

15. An antenna system comprising a first microwave lens means composed of a first set of mutually spaced parallel conductive plates, means adapted to illuminate said first lens means with electromagnetic energy having an electric polarization parallel to said first set of conductive plates, said first lens means radiating a first beam of electromagnetic energy along its directive axis having an electric polarization parallel to said first set of conductive plates, a second microwave lens means composed of a second set of mutually spaced parallel conductive plates, means adapted to illuminate said second lens means with electromagnetic energy having an electric polarization parallel to said second set of conductive plates, said second lens means radiating a second beam of electromagnetic energy along its directive axis having an electric polarization parallel to said second set of conductive plates, and means combining said first and second lens means into a unitary structure with said first set of parallel conductive plates situated between and extending at right angles to said second set of parallel conductive plates, the directive axis of said first lens means substantially coinciding with the directive axis of said second lens means.

16. In combination, a radar system for simultaneously tracking an object in space and searching about said object, comprising a microwave lens antenna, first scanning antenna feed means situated near the focus of said lens antenna, first radar transmitter means coupled to said first scanning antenna feed means for supply electromagnetic energy thereto, said first scanning antenna feed means illuminating said lens antenna for producing a first scanning beam of electromagnetic energy about the directive axis of said lens antenna, first radar receiver means coupled to said first scanning antenna feed means for receiving electromagnetic energy reflected from said object in space, means intercoupling said first receiver means and said lens antenna for orienting said lens antenna to track said object in space, means including a second scanning antenna feed means, second radar transmitter means coupled to said second antenna feed means for supplying electromagnetic energy thereto, said means including said second antenna feed means illuminating said lens antenna for producing a second scanning beam of electromagnetic energy about the directive axis of said lens antenna, second radar receiver means coupled to said second scanning antenna feed means for receiving electromagnetic energy reflected from a target located in the vicinity of said object being tracked.

17. A radar scanning antenna system for simultaneously radiating first and second independent scanning beams of electromagnetic energy about the same directive axis for simultaneously tracking an object in space and searching about said object, comprising in combination, a microwave lens structure, first scanning antenna feed means situated in the vicinity of the focus of said microwave lens structure, said first scanning antenna feed means being adapted to produce a first scanning beam of electromagnetic energy for illuminating said lens structure, said lens structure radiating said first scanning beam of energy about the directive axis of said lens, means including a second scanning antenna feed means situated apart from said first antenna feed means, said means including said second scanning antenna feed means being adapted to produce a second scanning beam of electromagnetic energy for illuminating said lens structure, said lens structure radiating said second scanning beam of energy about said directive axis, and means coupled to said radar scanning antenna system for orienting the directive axis of said antenna system in azimuth and elevation.

References Cited in the file of this patent
UNITED STATES PATENTS

| | | |
|---|---|---|
| 1,938,066 | Darbord | Dec. 5, 1933 |
| 2,452,349 | Becker | Oct. 26, 1948 |
| 2,473,613 | Smith | June 2, 1949 |
| 2,514,828 | Ayres | July 11, 1950 |
| 2,556,673 | Budenbom | June 12, 1951 |
| 2,585,855 | Sherwin et al. | Feb. 12, 1952 |
| 2,599,763 | Kock | June 10, 1952 |
| 2,607,009 | Affel | Aug. 12, 1952 |
| 2,677,056 | Cochrane et al. | Apr. 27, 1954 |
| 2,678,393 | Riblet | May 11, 1954 |
| 2,764,757 | Rust | Sept. 25, 1956 |

OTHER REFERENCES

Kock: Metal Lens Antenna, published in Proceedings of the IRE, vol. 34, pp. 828–836, November 1946.